United States Patent
Van Egmond et al.

(10) Patent No.: US 9,663,647 B2
(45) Date of Patent: May 30, 2017

(54) PRODUCING PROPYLENE IMPACT COPOLYMERS AND PRODUCTS

(71) Applicant: W. R. Grace & Co.-Conn., Columbia, MD (US)

(72) Inventors: Jan W. Van Egmond, Charleston, WV (US); Jeffrey D. Goad, Barboursville, WV (US)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 15/035,980

(22) PCT Filed: Nov. 26, 2014

(86) PCT No.: PCT/US2014/067699
§ 371 (c)(1),
(2) Date: May 11, 2016

(87) PCT Pub. No.: WO2015/081251
PCT Pub. Date: Jun. 4, 2015

(65) Prior Publication Data
US 2016/0289436 A1    Oct. 6, 2016

Related U.S. Application Data

(60) Provisional application No. 61/908,816, filed on Nov. 26, 2013.

(51) Int. Cl.
C08L 23/00 (2006.01)
C08L 23/14 (2006.01)
C08L 23/12 (2006.01)

(52) U.S. Cl.
CPC ............. *C08L 23/14* (2013.01); *C08L 23/12* (2013.01); *C08L 2205/02* (2013.01); *C08L 2205/025* (2013.01); *C08L 2207/02* (2013.01); *C08L 2308/00* (2013.01); *C08L 2314/02* (2013.01)

(58) Field of Classification Search
CPC ...... C08L 23/14; C08L 23/12; C08L 2205/02; C08L 2205/025; C08L 2207/02; C08L 2308/00; C08L 2314/02
See application file for complete search history.

(56) References Cited

U.S. PATENT DOCUMENTS

| | | | |
|---|---|---|---|
| 4,882,380 A | 11/1989 | Ficker et al. | |
| 5,705,576 A | 1/1998 | Buehler et al. | |
| 6,087,459 A | 7/2000 | Miro et al. | |
| 8,207,271 B2 | 6/2012 | Denifl et al. | |
| 2007/0015877 A1* | 1/2007 | Burkhardt et al. | C08L 23/10 525/240 |
| 2009/0209706 A1 | 8/2009 | Sheard et al. | |
| 2010/0167058 A1 | 7/2010 | Van Egmond et al. | |
| 2011/0152067 A1 | 6/2011 | Chen et al. | |
| 2012/0130018 A1* | 5/2012 | Sheard et al. | B01J 8/1809 525/240 |
| 2013/0281630 A1 | 10/2013 | Leskinen et al. | |

FOREIGN PATENT DOCUMENTS

| | | |
|---|---|---|
| CN | 1031705 A | 3/1989 |
| CN | 1887916 A | 1/2007 |
| CN | 101993509 | 3/2011 |
| CN | 102203140 A | 9/2011 |
| EP | 0597461 A2 | 5/1994 |
| WO | 2008015113 A2 | 2/2008 |

OTHER PUBLICATIONS

Shamiri et al "The Influence of Ziegler-Natta and Metallocene Catalysts on Polyolefin Structure, Properties, and Processing Ability" Materials 2014, 7, 5069-5108.*
International Search Report for Application No. PCT/US14/67699 dated Jan. 29, 2015.
Chinese Search Report for Application No. 2014800741219, dated Mar. 3, 2017.

* cited by examiner

*Primary Examiner* — Nathan M Nutter
(74) *Attorney, Agent, or Firm* — Lerner, David, Littenberg, Krumholz & Mentlik, LLP

(57) ABSTRACT

A process for producing a propylene impact copolymer (ICOP), the process comprising the steps of feeding propylene and optionally one or more first comonomers into a first reactor; feeding into the first reactor a catalyst mixture; contacting the propylene with the catalyst mixture under first polymerization conditions to form an active propylene-based polymer; transferring at least a portion of the first reactor contents to a second reactor; feeding additional activity limiting agent, additional selectivity control agent and, optionally additional cocatalyst and one or more second comonomers into the second reactor; and maintaining the second reactor at a second reactor temperature in a range that is sufficient to allow copolymerization to form the propylene impact copolymer (ICOP), wherein the second reactor temperature is below 70° C.

15 Claims, 1 Drawing Sheet

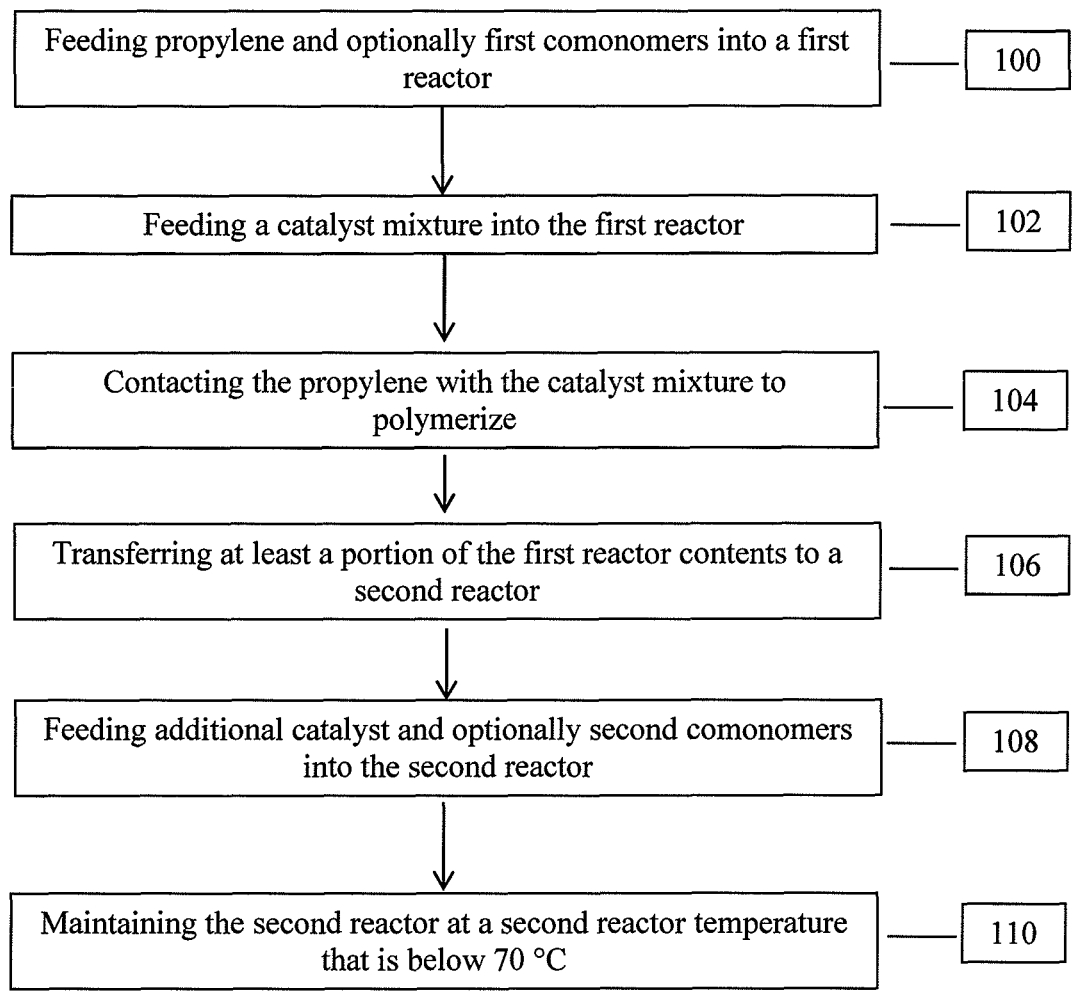

PRODUCING PROPYLENE IMPACT COPOLYMERS AND PRODUCTS

CROSS-REFERENCE TO RELATED APPLICATIONS

The present application is a national phase entry under 35 U.S.C. §371 of International Application No. PCT/US2014/067699 filed on Nov. 26, 2014, published in English, which claims priority from U.S. Provisional Patent Application No. 61/908,816 filed Nov. 26, 2013, all of which are incorporated herein by reference.

FIELD OF THE INVENTION

This invention relates to propylene impact copolymers, and more particularly to a process for producing propylene impact copolymers.

BACKGROUND OF THE INVENTION

When producing impact copolymer (ICOP) products, e.g., a propylene impact copolymer, a second reactor (also known as the impact reactor) is used in series with a first reactor. In the first reactor typically polypropylene homopolymer, known as the "matrix" material, is produced. In the second reactor (i.e., impact reactor), both propylene and comonomer(s), such as ethylene, are added to produce a "rubber-phase" dispersed within the matrix material. The resulting material is known as an impact copolymer, and it has beneficial properties, such as good impact resistance while maintaining much of its stiffness modulus. The weight fraction of the rubber material in the final ICOP product is called the fraction copolymer or rubber content, abbreviated Fc.

To increase the impact resistance of an ICOP, those skilled in the art know that the rubber content of the ICOP must be increased. The product in the second reactor is typically in the form of a powder and a major problem in producing high impact copolymer products (HICOP), e.g., with Fc greater than or equal to 25 weight percent (wt %), is particle stickiness. When the Fc exceeds a certain value (the value is a function of, among other things, reagents, catalyst and reaction conditions), the rubber material causes the surface of the powder particles to become sticky, particles agglomerate, and the continuity of the reactor operation can be compromised. In addition, particle stickiness is detrimental to product flowability, and so can cause problems in downstream operations such as flow through a purge bin or flow to a pelleter.

With certain catalysts, e.g., catalysts comprising a procatalyst, cocatalyst and a mixed external electron donor (MEED), and particularly for high rubber content HICOP, it is necessary to feed additional cocatalyst (also known as an activator) to the impact reactor in order to produce the needed amount of rubber material to achieve the desired Fc. This additional cocatalyst, e.g., triethylaluminum (TEA or TEAl), can also be problematic because it tends to increase the stickiness and reduce the flowability of the powder. Without being bound to a theory, the rubber material on the external surfaces of particles is believed to contribute to the stickiness and the addition of cocatalyst to the second reactor preferentially causes production of the rubber phase on the surface of the ICOP particles rather than within the interior of the particles.

SUMMARY OF THE INVENTION

Accordingly, one example of the present invention is a process for producing a propylene impact copolymer (ICOP), the process comprising the steps of feeding propylene and optionally one or more first comonomers into a first reactor; feeding into the first reactor a catalyst mixture comprising (1) a Ziegler-Natta catalyst composition comprising (a) a transition metal compound, and (b) an internal electron donor, (2) a cocatalyst, and (3) an external donor comprising (a) an activity limiting agent and (b) a selectivity control agent; contacting the propylene with the catalyst mixture under first polymerization conditions to polymerize the propylene and the optionally one or more first comonomers to form an active propylene-based polymer; transferring at least a portion of the first reactor contents to a second reactor, the first reactor contents comprising the active propylene-based polymer, the unreacted propylene, and the catalyst mixture; feeding additional activity limiting agent, additional selectivity control agent and, optionally additional cocatalyst and one or more second comonomers into the second reactor; and maintaining the second reactor at a second reactor temperature in a range that is sufficient to allow copolymerization of the active propylene-based polymer, the unreacted propylene and the optionally one or more second comonomers to form the ICOP, wherein the second reactor temperature is below 70° C.

In one embodiment, the optionally one or more first comonomers are not fed to the first reactor so that the propylene in the first reactor is polymerized to form propylene homopolymer. The optionally one or more second comonomers are fed into the second reactor. In another embodiment, the optionally one or more first comonomers are fed to the first reactor and the propylene is copolymerized with the optionally one or more first comonomers to form propylene copolymer. The optional comonomers may comprise a $C_2$ or $C_4$-$C_8$ alpha-olefin ($\alpha$-olefin). The cocatalyst may be triethylaluminum.

In one embodiment, the invention is a process for producing a high rubber content impact copolymer (HICOP), i.e., with Fc greater than or equal to ($\geq$) 25 wt %, powder product the particles of which have a stickiness, as shown by cup flowability tests, no greater than that of a low, i.e., less than (<) 25 wt %, Fc ICOP powder product. The process may employ a second (i.e., impact) reactor temperature below 70° C. The process in the impact reactor may employ little, e.g., 40 parts per million (ppm), if any, aluminum from TEAl as a cocatalyst in the second reactor. In one embodiment, the invention is a HICOP powder product the particles of which have a stickiness no greater than that of a low Fc ICOP, i.e., with Fc less than 25 wt %, powder product.

In one embodiment, the invention is a process of producing high rubber content ICOP. This may be achieved by reducing the second reactor temperature in the impact reactor to temperatures below those normally used (70° C. to 75° C.). Surprisingly, there is a strong temperature dependence of Fc capability in that Fc increases as the second reactor temperature decreases. The benefit of this is that higher Fc values can be attained without feeding cocatalyst, e.g., TEAl, or with reduced activator addition.

In one embodiment, the invention is a high Fc ICOP product.

BRIEF DESCRIPTION OF THE DRAWINGS

FIG. 1 shows a process for the production of a propylene impact copolymer (ICOP) in accordance with one embodiment of the present invention.

DETAILED DESCRIPTION

The present invention is described with reference to embodiments of the invention. Throughout the description of the invention, reference is made to FIG. 1. When referring to the figure, like elements shown throughout are indicated with like reference numerals.

DEFINITIONS

All references to the Periodic Table of the Elements refer to the Periodic Table of the Elements, published and copyrighted by CRC Press, Inc., 1990-1991. Also, any references to a Group or Groups shall be to the Groups or Groups reflected in this Periodic Table of the Elements using the IUPAC system for numbering groups. Unless stated to the contrary, implicit from the context, or customary in the art, all parts and percentages are based on weight. For purposes of United States patent practice, the contents of any patent, patent application, or publication referenced herein are incorporated by reference in their entirety (or the equivalent US version thereof is so incorporated by reference), especially with respect to the disclosure of synthetic techniques, definitions (to the extent not inconsistent with any definitions here provided) and general knowledge in the art.

The term "comprising" and its derivatives are not intended to exclude the presence of any additional component, step or procedure, whether or not the same is here disclosed. In order to avoid any doubt, all compositions here claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

Any numerical range here recited includes all values from the lower value to the upper value, in increments of one unit, provided that there is a separation of at least 2 units between any lower value and any higher value. As an example, if it is stated that the amount of a component, or a value of a compositional or a physical property, such as, for example, amount of a blend component, softening temperature, melt index, etc., is between 1 and 100, it is intended that all individual values, such as, 1, 2, 3, etc., and all subranges, such as, 1 to 20, 55 to 70, 197 to 100, etc., are expressly enumerated in this specification. For values which are less than one, one unit is considered to be 0.0001, 0.001, 0.01 or 0.1, as appropriate. These are only examples of what is specifically intended, and all possible combinations of numerical values between the lowest value and the highest value enumerated, are to be considered to be expressly stated in this application. In other words, any numerical range here recited includes any value or subrange within the stated range. Numerical ranges have been recited, as here discussed, reference melt index, melt flow rate, and other properties.

The terms "blend" or "polymer blend," as used herein, is a blend of two or more polymers. Such a blend may or may not be miscible (not phase separated at molecular level). Such a blend may or may not be phase separated. Such a blend may or may not contain one or more domain configurations, as determined from transmission electron spectroscopy, light scattering, x-ray scattering, and other methods known in the art.

The term "composition," as used herein, includes a mixture of materials which comprise the composition, as well as reaction products and decomposition products formed from the materials of the composition.

The term "polymer" means a macromolecular compound prepared by polymerizing monomers of the same or different type. "Polymer" includes homopolymers, copolymers, terpolymers, interpolymers, and so on. The term "interpolymer" means a polymer prepared by the polymerization of at least two types of monomers or comonomers. It includes, but is not limited to, copolymers (which usually refers to polymers prepared from two different types of monomers or comonomers, terpolymers (which usually refers to polymers prepared from three different types of monomers or comonomers), tetrapolymers (which usually refers to polymers prepared from four different types of monomers or comonomers), and the like.

The term "olefin-based polymer" is a polymer containing, in polymerized form, a majority weight percent of an olefin, for example ethylene or propylene, based on the total weight of the polymer. Nonlimiting examples of olefin-based polymers include ethylene-based polymers and propylene-based polymers.

The term, "propylene-based polymer," as used herein, refers to a polymer that comprises a majority weight percent polymerized propylene monomer (based on the total amount of polymerizable monomers), and optionally may comprise at least one polymerized comonomer.

The term "alkyl," as used herein, refers to a branched or unbranched, saturated or unsaturated acyclic hydrocarbon radical. Nonlimiting examples of suitable alkyl radicals include, for example, methyl, ethyl, n-propyl, i-propyl, 2-propenyl (or allyl), vinyl, n-butyl, t-butyl, i-butyl (or 2-methylpropyl), etc. The alkyls have 1 and 20 carbon atoms.

The term "substituted alkyl," as used herein, refers to an alkyl as just described in which one or more hydrogen atom bound to any carbon of the alkyl is replaced by another group such as a halogen, aryl, substituted aryl, cycloalkyl, substituted cycloalkyl, heterocycloalkyl, substituted heterocycloalkyl, halogen, haloalkyl, hydroxy, amino, phosphido, alkoxy, amino, thio, nitro, and combinations thereof. Suitable substituted alkyls include, for example, benzyl, trifluoromethyl and the like.

The term "aryl," as used herein, refers to an aromatic substituent which may be a single aromatic ring or multiple aromatic rings which are fused together, linked covalently, or linked to a common group such as a methylene or ethylene moiety. The aromatic ring(s) may include phenyl, naphthyl, anthracenyl, and biphenyl, among others. The aryls have from 1 to 20 carbon atoms.

Catalyst System

In one embodiment the catalyst mixture used in the practice of this invention comprises (1) a Ziegler-Natta catalyst composition comprising (a) a transition metal compound, and (b) an internal electron donor, (2) a cocatalyst, and (3) a mixed external electron donor (MEED) comprising (a) one or more activity limiting agents (ALA), and/or (b) one or more selectivity control agents (SCA), each of which is described below.

Any conventional Ziegler-Natta catalyst may be used in the present catalyst composition as is commonly known in the art. In an embodiment, the Ziegler-Natta catalyst composition contains a transition metal compound and a Group 2 metal compound. The transition metal compound may be a solid complex derived from a transition metal compound, for example, titanium-, zirconium-, chromium- or vanadium-hydrocarbyloxides, hydrocarbyls, halides, or mixtures thereof.

The transition metal compound has the general formula TrX$_x$ where Tr is the transition metal, X is a halogen or a C$_{1-10}$ hydrocarboxyl or hydrocarbyl group, and x is the number of such X groups in the compound in combination with a Group 2 metal compound. Tr may be a Group 4, 5 or 6 metal. In an embodiment, Tr is a Group 4 metal, such as titanium. X may be chloride, bromide, C$_{1-4}$ alkoxide or phenoxide, or a mixture thereof. In an embodiment, X is chloride.

Nonlimiting examples of suitable transition metal compounds that may be used to form the Ziegler-Natta catalyst composition are TiCl$_4$, ZrCl$_4$, TiBr$_4$, TiCl$_3$, Ti(OC$_2$H$_5$)$_3$Cl, Zr(OC$_2$H$_5$)$_3$Cl, Ti(OC$_2$H$_5$)$_3$Br, Ti(OC$_3$H$_7$)$_2$Cl$_2$, Ti(OC$_6$H$_5$)$_2$Cl$_2$, Zr(OC$_2$H$_5$)$_2$Cl$_2$, and Ti(OC$_2$H$_5$)Cl$_3$. Mixtures of such transition metal compounds may be used as well. No restriction on the number of transition metal compounds is made as long as at least one transition metal compound is present. In an embodiment, the transition metal compound is a titanium compound.

Nonlimiting examples of suitable Group 2 metal compounds include magnesium halides, dialkoxymagnesiums, alkoxymagnesium halides, magnesium oxyhalides, dialkylmagnesiums, magnesium oxide, magnesium hydroxide, and carboxylates of magnesium. In an embodiment, the Group 2 metal compound is magnesium dichloride.

In a further embodiment, the Ziegler-Natta catalyst composition is a mixture of titanium moieties supported on or otherwise derived from magnesium compounds. Suitable magnesium compounds include anhydrous magnesium chloride, magnesium chloride adducts, magnesium dialkoxides or aryloxides, or carboxylated magnesium dialkoxides or aryloxides. In an embodiment, the magnesium compound is a magnesium di(C$_{1-4}$)alkoxide, such as diethoxymagnesium.

Nonlimiting examples of suitable titanium moieties include titanium alkoxides, titanium aryloxides, and/or titanium halides. Compounds used to prepare the Ziegler-Natta catalyst composition include one or more magnesium-di (C$_{1-4}$)alkoxides, magnesium dihalides, magnesium alkoxyhalides, or mixtures thereof and one or more titanium tetra(C$_{1-4}$) alkoxides, titanium tetrahalides, titanium(C$_{1-4}$) alkoxyhalides, or mixtures thereof.

A precursor composition may be used to prepare the Ziegler-Natta catalyst composition as is commonly known in art. The precursor composition may be prepared by the chlorination of the foregoing mixed magnesium compounds, titanium compounds, or mixtures thereof, and may involve the use of one or more compounds, referred to as "clipping agents", that aid in forming or solubilizing specific compositions via a solid/solid metathesis. Nonlimiting examples of suitable clipping agents include trialkylborates, especially triethylborate, phenolic compounds, especially cresol, and silanes.

In an embodiment, the precursor composition is a mixed magnesium/titanium compound of the formula Mg$_d$Ti(OR$_e$)$_f$X$_g$ wherein R$_e$ is an aliphatic or aromatic hydrocarbon radical having 1 to 14 carbon atoms or COR' wherein R' is an aliphatic or aromatic hydrocarbon radical having 1 to 14 carbon atoms; each OR$_3$ group is the same or different; X is independently chlorine, bromine or iodine; d is 0.5 to 56, or 2-4; or 3; f is 2-116, or 5-15; and g is 0.5-116, or 1-3, or 2. The precursor may be prepared by controlled precipitation through removal of an alcohol from the reaction mixture used in its preparation. In an embodiment, the reaction medium comprises a mixture of an aromatic liquid, especially a chlorinated aromatic compound, such as chlorobenzene, with an alkanol, especially ethanol, and an inorganic chlorinating agent. Suitable inorganic chlorinating agents include chlorine derivatives of silicon, aluminum and titanium, such as titanium tetrachloride or titanium trichloride, and titanium tetrachloride in particular. The chlorinating agents lead to partial chlorination which results in a precursor containing relatively high level of alkoxy component(s). Removal of the alkanol from the solution used in the chlorination, results in precipitation of the solid precursor, having a desirable morphology and surface area. The precursor was separated from the reaction media. Moreover, the resulting precursor is particularly uniform particle sized and resistant to particle crumbling as well as degradation of the resulting procatalyst. In an embodiment, the precursor composition is Mg$_3$Ti(OEt)$_8$Cl$_2$.

The precursor is next converted to a solid procatalyst by further reaction (halogenation) with an inorganic halide compound, preferably a titanium halide compound, and incorporation of an internal electron donor. If not already incorporated into the precursor in sufficient quantity, the electron donor may be added separately before, during or after halogenation. This procedure may be repeated one or more times, optionally in the presence of additional additives or adjuvants, and the final solid product washed with an aliphatic solvent. Any method of making, recovering and storing the solid procatalyst is suitable for use in the present disclosure.

One suitable method for halogenation of the precursor is by reacting the precursor at an elevated temperature with a tetravalent titanium halide, optionally in the presence of a hydrocarbon or halohydrocarbon diluent. The preferred tetravalent titanium halide is titanium tetrachloride. The optional hydrocarbon or halohydrocarbon solvent employed in the production of olefin polymerization procatalyst preferably contains up to 12 carbon atoms inclusive, or up to 9 carbon atoms inclusive. Exemplary hydrocarbons include pentane, octane, benzene, toluene, xylene, alkylbenzenes, and decahydronaphthalene. Exemplary aliphatic halohydrocarbons include methylene chloride, methylene bromide, chloroform, carbon tetrachloride, 1,2-dibromoethane, 1,1,2-trichloroethane, trichlorocyclohexane, dichlorofluoromethane and tetrachlorooctane. Exemplary aromatic halohydrocarbons include chlorobenzene, bromobenzene, dichlorobenzenes and chlorotoluenes. The aliphatic halohydrocarbon may be a compound containing at least two chloride substituents such as carbon tetrachloride or 1,1,2-trichloroethane. The aromatic halohydrocarbon may be chlorobenzene or o-chlorotoluene.

The halogenation may be repeated one or more times, optionally accompanied by washing with an inert liquid such as an aliphatic or aromatic hydrocarbon or halohydrocarbon between halogenations and following halogenation. Further optionally one or more extractions involving contacting with an inert liquid diluent, especially an aliphatic or aromatic hydrocarbon, or aliphatic or aromatic halohydrocarbon, especially at an elevated temperature greater than 100° C., or greater than 110° C., may be employed to remove labile species, especially TiCl$_4$.

In an embodiment, the Ziegler-Natta catalyst composition includes a solid catalyst component obtained by (i) suspending a dialkoxy magnesium in an aromatic hydrocarbon or halohydrocarbon that is liquid at normal temperatures, (ii) contacting the dialkoxy magnesium with a titanium halide and further (iii) contacting the resulting composition a second time with the titanium halide, and contacting the dialkoxy magnesium with a diester of an aromatic dicarboxylic acid at some point during the treatment with the titanium halide in (ii).

In an embodiment, the Ziegler-Natta catalyst composition includes a solid catalyst component obtained by (i) suspending a precursor material of the formula $Mg_dTi(OR_e)_fX_g$ (as described previously) in an aromatic hydrocarbon or halohydrocarbon that is liquid at normal temperatures, (ii) contacting the precursor with a titanium halide and further (iii) contacting the resulting composition a second time with the titanium halide, and contacting the precursor with a diester of an aromatic dicarboxylic acid at some point during the treatment with the titanium halide in (ii).

The Ziegler-Natta catalyst composition includes an internal electron donor. The internal electron donor provides tacticity control and catalyst crystallite sizing. Nonlimiting examples of suitable internal electron donors include aromatic dicarboxylic acid esters, halides or anhydrides or (poly)alkyl ether derivatives thereof, especially $C_{1-4}$ dialkyl esters of phthalic or terephthalic acid, phthaloyl dichloride, phthalic anhydride, and $C_{1-4}$ (poly)alkyl ether derivatives thereof. In an embodiment, the internal electron donor is diisobutyl phthalate or di-n-butyl phthalate.

The Ziegler-Natta catalyst composition may also include an inert support material. The support may be an inert solid which does not adversely alter the catalytic performance of the transition metal compound. Examples include metal oxides, such as alumina, and metalloid oxides, such as silica.

The cocatalyst for use with the foregoing Ziegler-Natta catalyst composition is an aluminum containing composition. Nonlimiting examples of suitable aluminum containing compositions include organoaluminum compounds, such as trialkylaluminum-, dialkylaluminum hydride-, alkylaluminum dihydride-, dialkylaluminum halide-, alkylaluminumdihalide-, dialkylaluminum alkoxide-, and alkylaluminum dialkoxide-compounds containing from 1-10, or 1-6 carbon atoms in each alkyl- or alkoxide-group. In an embodiment, the cocatalyst is a $C_{1-4}$ trialkylaluminum compound, such as triethylaluminum (TEA or TEAl). The molar ratio of aluminum to titanium of from 35:1 to 50:1. In an embodiment, the molar ratio of aluminum to titanium to 45:1.

The catalyst mixture includes an external donor comprising a mixture of (a) one or more activity limiting agents (ALA) and/or (b) one or more silane selectivity control agents (SCA). In an embodiment, the ALA is an aliphatic ester. The aliphatic ester may be a $C_4$-$C_{30}$ aliphatic acid ester, may be a mono- or a poly- (two or more) ester, may be straight chain or branched, may be saturated or unsaturated, and any combination thereof. The $C_4$-$C_{30}$ aliphatic acid ester may also be substituted with one or more Group 14, 15 or 16 heteroatom containing substituents. Nonlimiting examples of suitable $C_4$-$C_{30}$ aliphatic acid esters include $C_{1-20}$ alkyl esters of aliphatic $C_{4-30}$ monocarboxylic acids, $C_{1-20}$ alkyl esters of aliphatic $C_{8-20}$ monocarboxylic acids, $C_{1-4}$ allyl mono- and diesters of aliphatic $C_{4-20}$ monocarboxylic acids and dicarboxylic acids, $C_{1-4}$ alkyl esters of aliphatic $C_{8-20}$ monocarboxylic acids and dicarboxylic acids, and $C_{4-20}$ alkyl mono- or polycarboxylate derivatives of $C_{2-100}$ (poly)glycols or $C_{2-100}$ (poly)glycol ethers. In a further embodiment, the $C_4$-$C_{30}$ aliphatic acid ester may be isopropyl myristate, di-n-butyl sebacate, (poly)(alkylene glycol) mono- or diacetates, (poly)(alkylene glycol) mono- or di-myristates, (poly)(alkylene glycol) mono- or di-laurates, (poly)(alkylene glycol) mono- or di-oleates, glyceryl tri(acetate), glyceryl tri-ester of $C_{2-40}$ aliphatic carboxylic acids, and mixtures thereof. In a further embodiment, the $C_4$-$C_{30}$ aliphatic ester is isopropyl myristate or di-n-butyl sebacate.

In an embodiment the ALA is a non-ester composition. As used herein, a "non-ester composition" is an atom, molecule, or compound that is free of an ester functional group. In other words, the "non-ester composition" does not contain the following functional group.

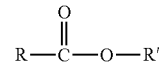

In an embodiment, the non-ester composition may be a dialkyl diether compound or an amine compound. The dialkyl diether compound is represented by the following formula,

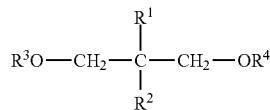

wherein $R^1$ to $R^4$ are independently of one another an alkyl, aryl or aralkyl group having up to 20 carbon atoms, which may optionally contain a group 14, 15, 16, or 17 heteroatom, provided that $R^1$ and $R^2$ may be a hydrogen atom. Nonlimiting examples of suitable dialkyl ether compounds include dimethyl ether, diethyl ether, dibutyl ether, methyl ethyl ether, methyl butyl ether, methyl cyclohexyl ether, 2,2-dimethyl-1,3-dimethoxypropane, 2,2-diethyl-1,3-dimethoxypropane, 2,2-di-n-butyl-1,3-dimethoxypropane, 2,2-diisobutyl-1,3-dimethoxypropane, 2-ethyl-2-n-butyl-1,3-dimethoxypropane, 2-n-propyl-2-cyclopentyl-1,3-dimethoxypropane, 2,2-dimethyl-1,3-diethoxypropane, 2-isopropyl-2-isobutyl-1,3-dimethoxypropane, 2,2-dicyclopentyl-1,3-dimethoxypropane, 2-n-propyl-2-cyclohexyl-1,3-diethoxypropane, and 9,9-bis(methoxymethyl)fluorene. In a further embodiment, the dialkyl ether compound is 2,2-diisobutyl-1,3-dimethoxypropane.

In an embodiment, the non-ester composition is an amine compound. Nonlimiting examples of suitable amine compounds include 2,6-substituted piperidines such as 2,6-dimethylpiperidine and 2,2,6,6-tetramethylpiperidine and 2,5-substituted piperidines. In a further embodiment, the piperidine compound is 2,2,6,6-tetramethylpiperidine.

For ALA that contains more than one carboxylate group, all the carboxylate groups are considered effective components. For example, a sebacate molecule contains two carboxylate functional groups is considered to have two effective functional molecules.

The SCA includes one or more silane compositions. The silane composition may include one or more alkoxysilanes having the general formula: $SiR_m(OR')_{4-m}$ (I) where R independently each occurrence is hydrogen or a hydrocarbyl or an amino group optionally substituted with one or more substituents containing one or more Group 14, 15, 16, or 17 heteroatoms R contains up to 20 atoms not counting hydrogen and halogen R' is a $C_{1-20}$ alkyl group, and m is 0, 1, 2 or 3. In an embodiment, R is $C_{6-12}$ aryl, alkyl or aralkyl, $C_{3-12}$ cycloallyl, $C_{3-12}$ branched alkyl, or $C_{3-12}$ cyclic amino group, R' is $C_{1-4}$ allyl, and m is 1 or 2. Nonlimiting examples of suitable silane compositions include dicyclopentyldimethoxysilane, di-tert-butyldimethoxysilane, methylcyclohexyldimethoxysilane, methylcyclohexyldiethoxysilane, di-n-butyldimethoxysilane, ethylcyclohexyldimethoxysilane, diphenyldimethoxysilane, diisopropyldimethoxysilane, di-n-propyldimethoxysilane, diisobutyldimethoxysilane, diisobutyldiethoxysilane, di-n-butyldimethoxysilane, cyclopentyltrimethoxysilane, isopropyltrimethoxysilane, n-propyltrimethoxysilane, n-propyltriethoxysilane, ethyltriethoxysilane, tetramethoxysilane, tetraethoxysilane, cyclopentylpyrrolidinodimethoxysilane, bis(pyrrolidino)dimethoxysilane, bis(perhydroisoquinolino)dimethoxysilane, and dimethyldimethoxysilane. In an embodiment, the silane composition may be dicyclopentyldimethoxysilane, methylcyclohexyl-dimethoxysilane, or n-propyltrimethoxysilane, and any combination of thereof. In a further embodiment, the silane composition is dicyclopentyldimethoxysilane.

The present catalyst composition may comprise two or more embodiments disclosed herein.

Process

FIG. 1 shows a process for the production of a propylene impact copolymer (ICOP) in accordance with one embodiment of the present invention. As shown in FIG. 1, the inventive process includes a feeding step 100. At feeding step 100, propylene and optionally one or more first comonomers are fed into a first reactor. The optionally one or more first comonomers may comprise one or more olefin monomers. Nonlimiting examples of suitable olefin monomers include ethylene, $C_{4-20}$ α-olefins, such as 1-butene, 1-pentene, 1-hexene, 4-methyl-1-pentene, 1-heptene, 1-octene, 1-decene, 1-dodecene and the like; $C_{4-20}$ diolefins, such as 1,3-butadiene, 1,3-pentadiene, norbornadiene, 5-ethylidene-2-norbornene (ENB) and dicyclopentadiene; $C_{8-40}$ vinyl aromatic compounds including styrene, o-, m-, and p-methylstyrene, divinylbenzene, vinylbiphenyl, vinylnapthalene; and halogen-substituted $C_{8-40}$ vinyl aromatic compounds such as chlorostyrene and fluorostyrene. In one embodiment, the optionally one or more first comonomers may not be fed into the first reactor. In another embodiment, the optionally one or more comonomers may be fed into the first reactor. The optionally one or more first comonomers may comprise one of a $C_2$ or $C_4$-$C_8$ alpha-olefin.

After the feeding step 100 is completed, the process continues to feeding step 102.

At feeding step 102, a catalyst mixture comprising (1) a Ziegler-Natta catalyst composition comprising (a) a transition metal compound, and (b) an internal electron donor, (2) a cocatalyst, and (3) an external donor comprising (a) an activity limiting agent, and (b) a selectivity control agent is fed into the first reactor. The cocatalyst may be triethylaluminum. After the feeding step 102 is completed, the process continues to contacting step 104.

At contacting step 104, the propylene and the optionally one or more first comonomers are contacted with the catalyst mixture under first polymerization conditions to polymerize the propylene and the optionally one or more first comonomers to form an active propylene-based polymer.

As used herein, "polymerization conditions", "copolymerization conditions" and like terms mean temperature and pressure parameters within a polymerization reactor suitable for promoting polymerization between the catalyst mixture and an olefin to form the desired polymer. The polymerization process may be a gas phase, a slurry, or a bulk polymerization process, operating in one, or more than one, polymerization reactor. Accordingly, the polymerization reactor may be a gas phase polymerization reactor, a liquid-phase polymerization reactor, or a combination thereof.

In one embodiment, the formation of the active propylene-based polymer occurs by way of a gas phase polymerization process in which the catalyst mixture or composition is contacted with the propylene and the optionally one or more first comonomers in the first polymerization reactor. One or more first comonomers can be optionally introduced into the first polymerization reactor along with the propylene to react under first polymerization conditions to form an active propylene-based polymer, or copolymer, or a fluidized bed of polymer particles.

It is understood that provision of hydrogen in the polymerization reactor is a component of the polymerization conditions. During polymerization, hydrogen is a chain transfer agent and affects the molecular weight (and correspondingly the melt flow rate) of the resultant polymer.

Polymerization may occur by way of gas phase polymerization. As used herein, "gas phase polymerization," or "gas phase polymerizing," is the passage of an ascending fluidizing medium, the fluidizing medium containing one or more monomers, in the presence of a catalyst mixture through a fluidized bed of polymer particles maintained in a fluidized state by the fluidizing medium. "Fluidization," "fluidized," or "fluidizing" is a gas-solid contacting process in which a bed of finely divided polymer particles is lifted and agitated by a rising stream of gas. Fluidization occurs in a bed of particulates when an upward flow of fluid through the interstices of the bed of particles attains a pressure differential and frictional resistance increment exceeding particulate weight. Thus, a "fluidized bed" is a plurality of polymer particles suspended in a fluidized state by a stream of a fluidizing medium. A "fluidizing medium" is one or more olefin gases, optionally a carrier gas (such as $H_2$ or $N_2$) and optionally a liquid (such as a hydrocarbon) which ascends through the gas-phase reactor.

A typical gas-phase polymerization reactor (or gas phase reactor) may include a vessel (i.e., the reactor), a fluidized bed, a distribution plate, inlet and outlet piping, a compressor, a cycle gas cooler or heat exchanger, and a product discharge system. The vessel includes a reaction zone and a velocity reduction zone, each of which is located above the distribution plate. The bed is located in the reaction zone. The fluidizing medium may include propylene gas and at least one other gas such as an olefin and/or a carrier gas such as hydrogen or nitrogen. The gas phase polymerization may be performed in condensing mode.

In one embodiment, the contacting step 104 occurs by way of feeding the catalyst mixture into the first reactor and then introducing the propylene and the optionally one or more first comonomers into the first polymerization reactor. The catalyst mixture may comprise a cocatalyst. The cocatalyst can be mixed with the procatalyst composition (pre-mix) prior to the introduction of the procatalyst composition into the polymerization reactor. The cocatalyst may also be added to the polymerization reactor independently of the procatalyst composition. The independent introduction of the cocatalyst into the polymerization reactor can occur simultaneously, or substantially simultaneously, with the procatalyst composition feed.

In one embodiment, the process includes mixing or otherwise combining the MEED with the procatalyst composition. The MEED can be complexed with the cocatalyst and/or mixed with the procatalyst composition (pre-mix) prior to the contacting between the catalyst composition and the propylene. The MEED (or individual components thereof) may be added independently to the first polymerization reactor.

In another embodiment, the first polymerization conditions include maintaining a hydrogen partial pressure below about 80 psi, preferably below about 71 psi, or more preferably below about 63 psi in the first reactor. The process may include self-limiting the polymerization process when the temperature in the first reactor is greater than about 100° C.

After the contacting step 104 is completed, the process continues to transferring step 106.

At transferring step 106, at least a portion of the first reactor contents is transferred into a second reactor. The first reactor contents may comprise the active propylene-based polymer, the unreacted propylene, and the catalyst mixture.

After the transferring step 106 is completed, the process continues to feeding step 108.

At feeding step 108, additional activity limiting agent, additional selectivity control agent and, optionally additional cocatalyst and one or more second comonomers are fed into the second reactor.

In one embodiment, the first polymerization reactor and the second polymerization reactor operate in series, whereby the effluent from the first polymerization reactor is charged to the second polymerization reactor and one or more additional (or different) second comonomers are added to the second polymerization reactor to continue polymerization. The optionally one or more second comonomers may be olefins other than propylene. Each of the first polymerization reactor and the second polymerization reactor may be a gas phase polymerization reactor. Both the first and second reactors may be fluid-bed reactors. The optionally additional cocatalyst may not be fed into the second reactor. After the feeding step 108 is completed, the process continues to maintaining step 110.

At maintaining step 110, the second reactor is maintained at a second reactor temperature in a range that is sufficient to allow copolymerization of the active propylene-based polymer, the unreacted propylene and the optionally one or more second comonomers to form the propylene impact copolymer (ICOP), wherein the second reactor temperature is below 70° C., preferably does not exceed 68° C., and more preferably does not exceed 65° C. The weight fraction of rubber material in the ICOP may be greater than or equal to 25 wt %.

At maintaining step 110, the active propylene-based polymer or copolymer from the first reactor contents is contacted with at least one or more comonomers in the second polymerization reactor under second polymerization conditions. In one embodiment, a propylene impact copolymer having a melt flow rate greater than about 60 g/10 min as measured in accordance with ASTM D1238-01 is formed in the second reactor. The optionally one or more second comonomers may comprise at least one olefin other than propylene. The optionally one or more second comonomers may comprise one of a $C_2$ or $C_4$-$C_8$ alpha-olefin. The optionally one or more first comonomers may be the same or different from the optionally one or more second comonomers.

Propylene impact copolymer may be a heterophasic copolymer. As used herein, a "heterophasic copolymer" is a multiple phase polymer having a continuous polymer phase (also referred to as the matrix phase) and a discontinuous polymer phase (also referred to as the elastomeric phase or the rubber phase, or rubber) dispersed within the continuous polymer phase. The propylene-based polymer produced in the first reactor is the continuous phase. The olefin is polymerized in the presence of the propylene-based polymer in the second reactor and forms the discontinuous phase. A heterophasic copolymer may contain more than two polymer phases.

The olefin introduced in the second reactor may be propylene, ethylene, a $C_{4-20}$ α-olefin (such as 1-butene, 1-pentene, 1-hexene, 4-methyl-1-pentene, 1-heptene, 1-octene, 1-decene, 1-dodecene and the like), or any combination thereof. In an embodiment, propylene and ethylene are contacted with the active propylene-based polymer in the second reactor to form a propylene impact copolymer with a propylene/ethylene copolymer as the discontinuous phase.

In one embodiment the invention is a process for producing HICOP using first and second fluid-bed reactors coupled in series. In the first reactor, propylene and optionally one or more alpha-olefins are polymerized to form a propylene homopolymer or copolymer (the matrix polymer) by contacting the propylene and optional comonomer under polymerization conditions with a catalyst mixture comprising (1) a Ziegler-Natta catalyst composition comprising (a) a transition metal compound, and (b) an internal electron donor, (2) a cocatalyst, and (3) a mixed external electron donor (MEED) comprising (a) an activity limiting agent (ALA), and (b) a selectivity control agent (SCA).

Upon the polymerization of the propylene and optional comonomer in the first reactor, some or all of the contents of the first reactor are transferred to the second reactor to which additional catalyst mixture is added, typically just additional MEED as opposed to additional procatalyst composition, and optionally one or both of the cocatalyst and optional comonomer. The contents of the first reactor transferred to the second reactor typically comprises (i) polymerized product, e.g., polymerized propylene as propylene homopolymer, polymerized propylene and comonomer (if comonomer was added to the first reactor) as propylene copolymer, (ii) unreacted propylene and any unreacted optional comonomer, and (iii) catalyst mixture. In the second reactor some, if not most or all, of the rubber phase of the HICOP is prepared. The polymerization conditions of the second reactor include a second reactor temperature which is below 70° C., preferably not in excess of 68° C. and more preferably not in excess of 65° C.

The contents of the first reactor are transferred to the second reactor by means well known to those skilled in the art. Similarly, the HICOP is recovered from the second reactor and subsequently purified to the desired degree by methods well known to those skilled in the art. The process reagents, catalyst mixture and protocol are further described in U.S. Pat. Nos. 8,067,510 and 7,935,766.

As used herein, "fraction copolymer" ("Fc") is the weight percent of the discontinuous phase present in the heterophasic copolymer. The Fc value is based on the total weight of the propylene impact copolymer.

The propylene impact copolymer may have an Ec value from 20 wt % to 90 wt %, or from 30 wt % to 80 wt %, or from 40 wt % to 60 wt %. As used herein, "ethylene content" ("Ec") is the weight percent of ethylene present in the discontinuous phase of the propylene impact copolymer. The Ec value is based on the total weight of the discontinuous (or rubber) phase.

In an embodiment, the polymerization process includes maintaining a hydrogen-to-propylene ("$H_2/C_3$") mole ratio less than 0.3 in the first polymerization reactor, and/or in the second polymerization reactor. It has been found that propylene-based polymers produced by way of a $H_2/C_3$ mole ratio greater than 0.3 contain excessive amounts of catalytic residue such as titanium and/or chlorine. The resultant propylene-based polymer formed by way of the present process avoids excessive amounts of catalytic residue as the $H_2/C_3$ mole ratio is less than 0.3.

In another embodiment, the process includes maintaining a $H_2/C_3$ mole ratio of less than 0.10, preferably less than 0.08, more preferably less than 0.04, and most preferably less than 0.03, in the second polymerization reactor. Maintaining the $H_2/C_3$ mole ratio to less than 0.3 (and/or maintaining the $H_2/C_3$ mole ratio to less than 0.1 in the second reactor) lowers hydrogen consumption and improves catalyst activity as a smaller presence of hydrogen lowers the partial pressure of the propylene and/or other olefin.

In an embodiment, the process includes introducing a MEED, or one or more components thereof, into the second reactor. Thus, one or more selectivity control agents and/or one or more activity limiting agents, separately, or in any combination, may be added to the second reactor.

The process may comprise two or more embodiments disclosed herein.

In an embodiment, the polymerization occurs by way of gas phase polymerization. In other words, the contact between the active propylene-based polymer and the olefin(s) occurs in a gas phase polymerization reactor under polymerization conditions. The polymerization reactor may be the second polymerization reactor as disclosed above.

In an embodiment, the process includes maintaining a $H_2/C_3$ mole ratio of less than 0.20, or less than 0.10, or less than 0.08, or less than 0.04, or less than 0.03 during formation of the propylene impact copolymer.

In an embodiment, the active propylene-based polymer is contacted with propylene and ethylene. The process includes forming a propylene impact copolymer with an Fc value from 25 wt % to 50 wt %, and an Ec value from 20 wt % to 90 wt %.

The process may comprise two or more embodiments disclosed herein.

In one embodiment, the present disclosure provides a propylene impact copolymer. The propylene impact copolymer includes a propylene-based polymer (matrix phase) with a propylene/ethylene copolymer (discontinuous phase) dispersed therein. The propylene impact copolymer may have a melt flow rate greater than about 60 g/10 min. In an embodiment, the propylene-based polymer has a melt flow rate (MFR) greater than 160 g/10 min and the propylene impact copolymer has a MFR greater than 85 g/10 min. In another embodiment, the propylene-based polymer has a MFR greater than 200 g/10 min and the propylene impact copolymer has a MFR greater than 100 g/10 min. In another embodiment, the propylene-based polymer has a MFR greater than 300 g/10 min and the propylene impact copolymer has a MFR greater than 150 g/10 min. In a further embodiment, the propylene-based polymer is a propylene homopolymer.

In an embodiment the propylene-based polymer produced in the first reactor has one or more of the following properties: xylene solubles content of less than 4 wt %, or less than 2 wt %; and a $T_{MF}$ greater than 170° C.

In an embodiment, the propylene impact copolymer is a nucleated propylene impact copolymer.

The present propylene impact copolymer may be used for a variety of applications such as automotive interior parts where low volatiles are required, and can be used for many food contact applications such as cups and containers. Additionally, many ordinary molded articles such as toys, pails, buckets, and general purpose articles can take advantage of the high melt flow product and impact strength properties and/or low volatiles content of the present propylene impact copolymer. The present propylene impact copolymer can also be used to produce fibers for carpets, upholstery, and diapers.

The propylene impact copolymer may comprise two or more embodiments disclosed herein.

EXAMPLES

Test Method

Cup Test Index is determined by a method developed in-house to measure powder flowability of high rubber content polypropylene impact copolymer powder. It is especially useful when resin tends to get sticky and angle of repose methods are difficult. The method procedure consists of filling a polystyrene cup (typically used for coffee) with resin powder. The cup is then inverted on a flat surface for 10 minutes. The cup is then removed and the tester then observes the shape of the powder and how long it takes to deform and collapse from the initial cup shape. The cup test results are also correlated to operational issues at a typical commercial gas phase polymerization unit operating the UNIPOL® Polypropylene process, which is available for license by W.R. Grace & Co.—Conn and/or its affiliates. Table 1 lists the Cup Index and typical operational issues.

TABLE 1

| Cup Test Index | Powder shape retention time (10 min test) | Typical Operational Consequences to Powder Handling System |
|---|---|---|
| 0 | Immediately loses its shape | No issues |
| 1 | 1 second to lose its shape | No issues |
| 2 | 15 seconds to lose its shape | No issues |
| 3 | 1 minute to lose its shape | No issues |
| 4 | Indefinite - needs some agitation to make it lose its shape | Observations of stickiness Some build up in rotary feeder |
| 5 | Indefinite - needs considerable agitation to make it lose its shape | Increased build up in rotary feeder Reduction in production rates |
| 6 | Indefinite - needs aggressive agitation to make it lose its shape | Considerable build up Potential to shut down production |
| 7 | Never | Not possible to run |

All the examples involve catalyst systems composed of (1) a supported Ziegler-Natta catalyst, (2) a co-catalyst, and (3) an external electron donor. The following pro-catalysts, catalysts, co-catalyst, and external electron donors were employed in the examples, The pro-catalyst is a Ziegler-Natta catalyst detailed in Example 4 of U.S. Pat. No. 8,778,826 and U.S. Pat. No. 8,536,372. The nominal average particle size of the catalyst is 27 microns in Comparative Examples 1-3 and 6 and Examples 4 and 5, and 12 microns in Comparative Example 7 and Example 8.

The Co-catalyst is TEAl (Triethylaluminum).

In all the examples listed below, the MEED fed to the first reactor (Rx1) is 20% DCPDMS (dicyclopentyldimethoxysilane) as SCA and 80% IPM (iso-propylmyristate) as ALA.

In all the examples below, the MEED fed to the second reactor (Rx2) is 40 mol % NPTMS (n-propyltrimethoxysilane) as SCA and 60 mol % IPM (iso-propylmyristate) as ALA.

Polypropylene impact copolymer (ICOP) was produced in the following examples. All polymerization reactions listed in the examples were conducted in a system of two gas phase fluidized-bed UNIPOL® polypropylene process reactors available for license by W.R. Grace & Co.—Conn and/or its affiliates linked in series such as described in U.S. Pat. No. 4,882,380, the entire content of which is incorporated by reference herein. A homopolymer matrix is produced in the first reactor and ethylene-propylene copolymer is produced in the second reactor. The impact copolymer (ICOP) product is discharged from the second reactor.

Detailed operating conditions and products information of Comparative Examples 1-3 and 6 and Examples 4 and 5 are listed in TABLE 2.

TABLE 2

| | | Example | | | | | |
|---|---|---|---|---|---|---|---|
| | | Comparative 1 | Comparative 2 | Comparative 3 | 4 | 5 | Comparative 6 |
| Catalyst Type | | Catalyst B | Catalyst B | Catalyst B | Catalyst B | Catalyst B | 0 |
| Reactor 1 Powder Properties | | | | | | | |
| Melt Flow | (dg/min) | 4.3 | 4.6 | 26.3 | 6.8 | 4.2 | 2.0 |
| XS - Wet | (wt %) | 1.51 | 1.50 | 1.68 | 1.49 | 1.42 | 1.44 |
| Reactor 2 Powder Properties | | | | | | | |
| Melt Flow | (dg/min) | 2.66 | 1.83 | 15.18 | 3.34 | 1.63 | 0.78 |
| Ec | (wt %) | 44.5 | 44.9 | 42.7 | 40.7 | 41.1 | 42.2 |
| Fc | (wt %) | 21.1 | 31.3 | 16.1 | 28.8 | 36.5 | 34.9 |
| Reactor 1 Conditions | | | | | | | |
| Reactor Temperature | (° C.) | 72.0 | 72.0 | 72.0 | 72.0 | 72.0 | 72.0 |
| Residence Time | (hr) | 1.7 | 1.8 | 1.6 | 1.5 | 1.6 | 2.5 |
| C3 Partial Pressure | (psi) | 300.2 | 285.7 | 300.2 | 300.9 | 300.6 | 320.0 |
| H2/C3 | Molar Ratio | 0.02499 | 0.02383 | 0.06406 | 0.03173 | 0.02496 | 0.01522 |
| Alkyl1 Type | | TEAl | TEAl | TEAl | TEAl | TEAl | TEAl |
| MEED1 Type | | DCPDMS/IPM | DCPDMS/IPM | DCPDMS/IPM | DCPDMS/IPM | DCPDMS/IPM | DCPDMS/IPM |
| TEAl1/Ti | Molar Flow Ratio | 49.3 | 49.6 | 49.8 | 49.6 | 49.5 | 50.0 |
| TEAl1/MEED | Molar Flow Ratio | 3.0 | 3.1 | 2.5 | 2.5 | 2.5 | 2.9 |
| Catalyst Productivity | (kg PP/kg catalyst) | 63,340 | 69,309 | 49,255 | 51,965 | 54,963 | 67,908 |
| Reactor 2 Conditions | | | | | | | |
| Reactor Temperature | (° C.) | 70 | 70 | 85 | 60 | 60 | 70 |
| Residence Time | (hr) | 2.2 | 2.0 | 2.8 | 2.0 | 1.9 | 2.9 |
| C3 Partial Pressure | (psi) | 110.3 | 153.5 | 107.8 | 108.8 | 122.2 | 164.9 |
| C2 Partial Pressure | (psi) | 55.6 | 72.7 | 49.7 | 49.9 | 56.7 | 70.3 |
| C3/C2 | Molar Ratio | 2.0 | 2.1 | 2.2 | 2.2 | 2.2 | 2.3 |
| H2/C3 | Molar Ratio | 0.0608 | 0.0403 | 0.0555 | 0.0461 | 0.0464 | 0.0305 |
| Alkyl Type | | no alkyl used | no alkyl used | no alkyl used | no alkyl used | no alkyl used | TEAl |
| MEED2 Type | | NPTMS/IPM | NPTMS/IPM | NPTMS/IPM | NPTMS/IPM | NPTMS/IPM | NPTMS/IPM |
| MEED2/MEED1 | Molar Flow Ratio | 0.30 | 0.23 | 0.10 | 0.15 | 0.16 | 0.82 |
| MEED2/Ti | Molar Flow Ratio | 4.99 | 3.75 | 1.94 | 3.01 | 3.10 | 14.1 |
| TEAL2/TEAL1 | Molar Flow Ratio | 0.0 | 0.0 | 0.0 | 0.0 | 0.0 | 0.82 |
| TEAl2/Ti | Molar Flow Ratio | 0.0 | 0.0 | 0.0 | 0.0 | 0.0 | 40.8 |
| Total Catalyst Productivity | (kg PP/kg catalyst) | 80,278 | 100,886 | 58,707 | 72,984 | 86,556 | 104,342 |

TABLE 2-continued

| | Example | | | | | |
|---|---|---|---|---|---|---|
| | Comparative 1 | Comparative 2 | Comparative 3 | 4 | 5 | Comparative 6 |
| Impact Reactor Operational Comment Result | Good | Bad, Formed Agglomerates<br><br>Reactor had to be shut down for cleaning | Good | Good | Good | Formed a large (>1 m) chunk of fused rubber<br>Reactor had to be shut down for extensive cleaning |

® indicates a registered mark of W.R. Grace & Co. - Conn

In Comparative Example 1, the second reactor temperature is at 70° C. The partial pressures of propylene and ethylene in the second reactor are given in Table 1. With the reactor conditions in this comparative example, the ICOP produced has a rubber content Fc of 21.1 wt %. Reactor operation was smooth.

In Comparative Example 2, the second reactor temperature is at 70° C. The partial pressures of propylene and ethylene in the second reactor are given in Table 1 and are significantly higher than those in Comparative Example 1. With the reactor conditions in this comparative example, a HICOP was produced with a rubber content Fc of 31.3 wt %, which is fairly high. However, under these conditions, agglomerates formed and the reactor had to be shut down, purged and opened up for cleaning.

In Comparative Example 3, the second reactor temperature is increased to 80° C. The partial pressures of propylene and ethylene in the second reactor are given in Table 1 and are slightly lower than those in Comparative Example 1. With the reactor conditions in this comparative example, the ICOP produced has a rubber content Fc of 16.1 wt %, which is fairly high. As can be seen, increasing the second reactor temperature to 80° C. results in a lower Fc capability at similar partial pressures as in Comparative Example 1. Under these conditions, reactor operation was smooth.

In Example 4, the second reactor temperature is lowered to 60° C. The partial pressures of propylene and ethylene in the second reactor are given in Table 1 and are slightly lower than those in Comparative Example 1. With the reactor conditions in this example, a HICOP was produced with a rubber content Fc of 28.8 wt %, which is fairly high. As can be seen, reducing the second reactor temperature to 60° C. results in a higher Fc capability at similar partial pressures as in Comparative Example 1. Under these conditions, reactor operation was smooth.

In Example 5, the second reactor temperature is 60° C. The partial pressures of propylene and ethylene in the second reactor are given in Table 1 and are lower than those in Comparative Example 2. With the reactor conditions in this example, a HICOP was produced with a rubber content Fc of 36.5 wt %, which is very high. As can be seen, reducing the second reactor temperature to 60° C. results in a significantly higher Fc capability, even at lower partial pressures. Under these conditions, reactor operation was smooth.

In Comparative Example 6, the second reactor temperature is 70° C. The partial pressures of propylene and ethylene in the second reactor are given in Table 1 and are lower than those in Example 2. With the reactor conditions in this example, a HICOP was produced with a rubber content Fc of 34.9 wt %, similar to that in Example 5. However, in order to achieve a similar Fc as that in Example 5, a significant amount of TEAl was fed to reactor 2 at a molar ratio of 40.8 TEAl to Ti contained as catalyst feed to reactor 1 (TEAl2/Ti). Moreover, in this example, the resin tended to agglomerate and reactor operation had to be stopped due to pluggage of the product discharge ports.

Detailed operating conditions and products information of Comparative Example 7 and Example 8 are listed in TABLE 3.

TABLE 3

| | | Example | |
|---|---|---|---|
| | | Comparative 7 | 8 |
| Catalyst Type | | Catalyst A | Catalyst A |
| Reactor 1 Powder Properties | | | |
| Melt Flow | (dg/min) | 59.4 | 51.1 |
| XS - Wet | (wt %) | 1.43 | 1.48 |
| Reactor 2 Powder Properties | | | |
| Melt Flow | (dg/min) | 19.0 | 15.7 |
| Ec | (wt %) | 40.4 | 42.9 |
| Fc | (wt %) | 26.9 | 26.5 |
| Reactor 1 Conditions | | | |
| Reactor Temperature | (° C.) | 70 | 68 |
| Residence Time | (hr) | 1.0 | 1.4 |
| C3 Partial Pressure | (kg/cm$^2$) | 29.6 | 27.7 |
| H2/C3 | Molar Ratio | 0.0577 | 0.1033 |
| Alkyl1 Type | | TEAl | TEAl |
| MEED1 Type | | DCPDMS/IPM | DCPDMS/IPM |
| TEAl1/Ti | Molar Flow Ratio | 45.0 | 44.9 |
| TEAl1/MEED | Molar Flow Ratio | 2.4 | 2.6 |
| Catalyst Productivity | (ton PP/kg catalyst) | 40.0 | 43.6 |
| Reactor 2 Conditions | | | |
| Reactor Temperature | (° C.) | 71 | 68 |
| Residence Time | (hr) | 2.6 | 2.9 |
| C3 Partial Pressure | (kg/cm$^2$) | 12.6 | 10.5 |
| C2 Partial Pressure | (kg/cm$^2$) | 4.9 | 4.5 |
| C3/C2 | Molar Ratio | 2.6 | 2.3 |
| H2/C3 | Molar Ratio | 0.039 | 0.054 |

TABLE 3-continued

| | | Example | |
|---|---|---|---|
| | | Comparative 7 | 8 |
| Alkyl Type | | TEAl | TEAl |
| MEED2 Type | | NPTMS/IPM | NPTMS/IPM |
| MEED2/MEED1 | Molar Flow Ratio | 0.18 | 0.17 |
| MEED2/Ti | Molar Flow Ratio | 3.3 | 3.0 |
| TEAL2/TEAL1 | Molar Flow Ratio | 1.46 | 0.38 |
| TEAl2/Ti | Molar Flow Ratio | 65.7 | 16.9 |
| Total Catalyst Productivity | (ton PP/kg catalyst) | 54.8 | 59.3 |
| Average Cup Test Index | | 2.0 | 0.6 |

In Comparative Example 7, the second reactor temperature is at 70.7° C. The partial pressures of propylene and ethylene in the second reactor are given in Table 2. TEAl was fed to the impact reactor at a molar flow ratio of 1.46 vs. the TEAl fed to the first reactor to achieve the rubber content, Fc of 26.9 wt %. Flowability of the powder was measured by the Cup Test Method. The HICOP powder produced with the conditions in this example result in an average cup test index of 2.0. This value for the cup test means that it takes 15 seconds for the powder to deform and flow during the test.

In Example 8, the second reactor temperature is 68.2° C. The partial pressures of propylene and ethylene in the second reactor are given in Table 2. TEAl was fed to the impact reactor at a molar flow ratio of 0.38 vs. the TEAl fed to the first reactor to achieve the rubber content, Fc of 26.5 wt %. HICOP powder produced with the conditions in this example result in an average cup test index of 0.6. This value for the cup test means that it takes less than 1 second for the powder to deform and flow during the test.

It is specifically intended that the present invention not be limited to the embodiments and illustrations contained herein, but include modified forms of those embodiments including portions of the embodiments and combinations of elements of different embodiments as come within the scope of the following claims.

What is claimed is:

1. A process for producing a propylene impact copolymer (ICOP), the process comprising the steps of:
feeding propylene monomer and optionally one or more first comonomers into a first reactor;
feeding into the first reactor a catalyst mixture comprising (1) a Ziegler-Natta catalyst composition comprising (a) a transition metal compound, and (b) an internal electron donor, (2) a cocatalyst, and (3) an external donor comprising (a) an activity limiting agent and (b) a selectivity control agent;
contacting the propylene with the catalyst mixture under first polymerization conditions to polymerize propylene and the optionally one or more first comonomers to form an active propylene-based polymer;
transferring at least a portion of the first reactor contents to a second reactor, the first reactor contents comprising the active propylene-based polymer, unreacted propylene monomer, and the catalyst mixture;
feeding additional activity limiting agent, additional selectivity control agent and, optionally additional cocatalyst and one or more second comonomers into the second reactor; and
maintaining the second reactor at a second reactor temperature in a range that is sufficient to allow copolymerization of the active propylene-based polymer, unreacted propylene monomer and the optionally one or more second comonomers to form the propylene impact copolymer (ICOP), wherein the second reactor temperature is below 70° C.

2. The process of claim 1 in which the optionally one or more first comonomers are not fed into the first reactor.

3. The process of claim 1 in which the optionally one or more first comonomers are fed into the first reactor.

4. The process of claim 1 in which the cocatalyst is triethylaluminum.

5. The process of claim 1 in which the optionally additional cocatalyst is not fed into the second reactor.

6. The process of claim 1 in which the optionally one or more first comonomers comprise one of a $C_2$ or $C_4$-$C_8$ alpha-olefin.

7. The process of claim 1 in which the optionally one or more second comonomers comprise one of a $C_2$ or $C_4$-$C_8$ alpha-olefin.

8. The process of claim 1, in which the optionally one or more first comonomers are the same as the optionally one or more second comonomers.

9. The process of claim 1, in which the optionally one or more first comonomers are different from the optionally one or more second comonomers.

10. The process of claim 1 in which the first and second reactors are fluid-bed reactors.

11. The process of claim 1 in which the second reactor temperature does not exceed 68° C.

12. The process of claim 1 in which the second reactor temperature does not exceed 65° C.

13. The process of claim 1 in which the weight fraction of rubber material in the propylene impact copolymer (ICOP) is greater than or equal to 25 wt %.

14. A propylene impact copolymer (ICOP) manufactured according to the process of claim 1.

15. A propylene impact copolymer (ICOP) manufactured according to the process of claim 12.

* * * * *